United States Patent
Walker

[11] Patent Number: 5,822,915
[45] Date of Patent: Oct. 20, 1998

[54] FISH HOOK BARB REMOVING TOOL

[76] Inventor: Jeffrey L. Walker, 1906 Beachway La., Odessa, Fla. 33556

[21] Appl. No.: 855,342

[22] Filed: May 13, 1997

[51] Int. Cl.$^6$ .................................................. A01K 97/00
[52] U.S. Cl. ............................................................ 43/53.5
[58] Field of Search .............................. 43/53.5; 81/418, 81/419, 421; 7/106

[56] References Cited

U.S. PATENT DOCUMENTS

| | | | |
|---|---|---|---|
| 1,935,149 | 11/1933 | Elvin | 43/53.5 |
| 2,531,522 | 11/1950 | Malouf | 43/53.5 |
| 2,842,997 | 7/1958 | Wentling | 43/53.5 |
| 3,597,775 | 8/1971 | McCasland | 7/106 |
| 4,631,855 | 12/1986 | Ader | 43/53.5 |
| 5,485,641 | 1/1996 | Machmeier et al. | 7/106 |

*Primary Examiner*—Thomas Price
*Attorney, Agent, or Firm*—Joseph N. Breaux

[57] ABSTRACT

A fish hook barb removing tool that includes a clipping mechanism having a handle assembly, a return spring assembly, a jaw assembly, upper and lower replaceable triangular cross-section shaped cutting blades, and upper and lower replaceable permanent magnets each having a magnet base with a partial triangular shaped cross-section; the jaw assembly including an upper jaw portion and a lower jaw portion, the upper jaw portion having an upper blade retaining keyway channel and an upper magnet retaining keyway channel formed therein, the lower jaw portion having a lower blade retaining keyway channel, a lower magnet retaining keyway channel, and a hook alignment slot formed therein, the upper blade retaining keyway channel and the lower blade retaining keyway channel each having a portion thereof having partial triangular cross sectional shape that is sized to receive and hold, respectively, a blade base portion of the upper and lower replaceable cutting blades, the upper magnet retaining keyway channel and the lower magnet retaining keyway channel each having a partial triangular cross sectional shape and are each sized to receive and hold, respectively, the magnet base of one of the upper and lower replaceable permanent magnets.

6 Claims, 2 Drawing Sheets

FISH HOOK BARB REMOVING TOOL

TECHNICAL FIELD

The present invention relates to clipping devices and more particularly to a fish hook barb removing tool that includes a clipping mechanism for clipping the barb from a fish hook, the clipping mechanism having a handle assembly, a return spring assembly, a jaw assembly, upper and lower replaceable triangular cross-section shaped cutting blades, and upper and lower replaceable permanent magnets each having a magnet base with a partial triangular shaped cross-section; the jaw assembly including an upper jaw portion and a lower jaw portion, the upper jaw portion having an upper blade retaining keyway channel and an upper magnet retaining keyway channel formed therein, the lower jaw portion having a lower blade retaining keyway channel, a lower magnet retaining keyway channel, and a hook alignment slot formed therein, the upper blade retaining keyway channel and the lower blade retaining keyway channel each having a portion thereof having partial triangular cross sectional shape that is sized to receive and hold, respectively, a blade base portion of the upper and lower replaceable cutting blades, the upper magnet retaining keyway channel and the lower magnet retaining keyway channel each having a partial triangular cross sectional shape and are each sized to receive and hold, respectively, the magnet base of one of the upper and lower replaceable permanent magnets.

BACKGROUND OF THE INVENTION

It is often necessary to cut the bard from a fish hook in order to minimize injury to a fish that is to be released. Although cutting the bard from the fish hook results in less trauma to the mouth and jaw of the fish, the cut off barb tip is often swallowed by the fish and can result in internal injuries to released fish. It would be a benefit, therefore, to have a fish hook barb removing tool that included a mechanism for trapping the cut off barb tip and preventing the cut off barb tip from being ingested by the fish. Because most fish hooks are constructed from magnetically attractable material, it would be a benefit to have a fish hook barb removing tool that would magnetically attract and hold the cut off barb tip. Because permanent magnets can loose magnetic attracting power over a period of time, it would be a benefit to have a fish hook barb removing tool that included replaceable permanent magnets for attracting and holding the cut off barb from a fish hook. In addition, because the permanent magnet in such a device would be subject to salt water and other harsh conditions, it would be a further benefit if the permanent magnet was a molded, rubberized permanent magnet.

SUMMARY OF THE INVENTION

It is thus an object of the invention to provide a fish hook barb removing tool that includes a mechanism for trapping the cut off barb tip and preventing the cut off barb tip from being ingested by a fish.

It is a further object of the invention to provide a fish hook barb removing tool that includes a magnetic retaining mechanism for magnetically attracting and holding the cut off barb tip.

It is a still further object of the invention to provide a fish hook barb removing tool that includes a magnetic retaining mechanism that includes replaceable permanent magnets for attracting and holding the cut off barb from a fish hook.

It is a still further object of the invention to provide a fish hook barb removing tool that includes a magnetic retaining mechanism that includes a molded, rubberized permanent magnet.

It is a still further object of the invention to provide a fish hook barb removing tool that includes a clipping mechanism having a handle assembly, a return spring assembly, a jaw assembly, upper and lower replaceable triangular cross-section shaped cutting blades, and upper and lower replaceable permanent magnets each having a magnet base with a partial triangular shaped cross-section; the jaw assembly including an upper jaw portion and a lower jaw portion, the upper jaw portion having an upper blade retaining keyway channel and an upper magnet retaining keyway channel formed therein, the lower jaw portion having a lower blade retaining keyway channel, a lower magnet retaining keyway channel, and a hook alignment slot formed therein, the upper blade retaining keyway channel and the lower blade retaining keyway channel each having a portion thereof having partial triangular cross sectional shape that is sized to receive and hold, respectively, a blade base portion of the upper and lower replaceable cutting blades, the upper magnet retaining keyway channel and the lower magnet retaining keyway channel each having a partial triangular cross sectional shape and are each sized to receive and hold, respectively, the magnet base of one of the upper and lower replaceable permanent magnets.

It is a still further object of the invention to provide a fish hook barb removing tool that accomplishes some or all of the above objects in combination.

Accordingly, a fish hook barb removing tool is provided. The fish hook barb removing tool comprises a clipping mechanism having a handle assembly, a return spring assembly, a jaw assembly, upper and lower replaceable triangular cross-section shaped cutting blades, and upper and lower replaceable permanent magnets each having a magnet base with a partial triangular shaped cross-section; the jaw assembly including an upper jaw portion and a lower jaw portion, the upper jaw portion having an upper blade retaining keyway channel and an upper magnet retaining keyway channel formed therein, the lower jaw portion having a lower blade retaining keyway channel, a lower magnet retaining keyway channel, and a hook alignment slot formed therein, the upper blade retaining keyway channel and the lower blade retaining keyway channel each having a portion thereof having partial triangular cross sectional shape that is sized to receive and hold, respectively, a blade base portion of the upper and lower replaceable cutting blades, the upper magnet retaining keyway channel and the lower magnet retaining keyway channel each having a partial triangular cross sectional shape and are each sized to receive and hold, respectively, the magnet base of one of the upper and lower replaceable permanent magnets. The upper and lower replaceable permanent magnets are preferably molded, rubberized permanent magnets.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
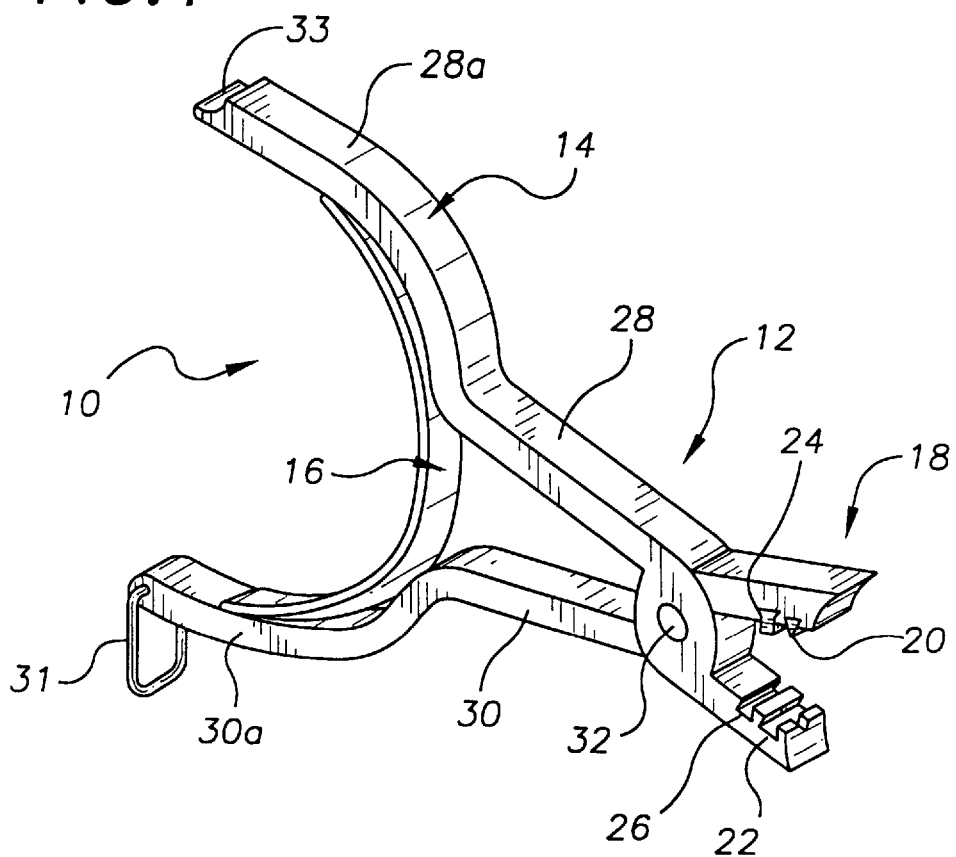
FIG. 1 is a perspective view of an exemplary embodiment of the fish hook barb removing tool of the present invention showing the clipping mechanism including the handle assembly, the return spring assembly and the jaw assembly; the upper and lower replaceable triangular shaped cutting blades; and the upper and lower replaceable permanent magnets with the triangular shaped base portion.

FIG. 1 shows an exemplary embodiment of the fish hook barb removing tool of the present invention generally designated by the numeral 10. Fish hook barb removing tool 10 includes a clipping mechanism, generally designated by the numeral 12 that includes a handle assembly, generally designated 14; a return spring assembly, generally designated 16; a jaw assembly, generally designated 18; upper and lower replaceable triangular shaped cutting blades, 20,22 respectively; and upper and lower replaceable permanent magnets 24,26, respectively. Handle assembly 14 and jaw assembly 18 are constructed from two hardened steel clipper members 28,30 that are pivotally connected in a clipper configuration by a brass pivot bar 32. Return spring assembly 16 is a U-shaped spring steel member connected between a handle end 28a of clipper member 28 and a handle end 30a of clipper member 30. A locking clip 31 is pivotally mounted to handle end 30a and is rotatable into locking relationship with a locking groove 33 formed into handle end 28a of clipper member 28.

Figure 2:
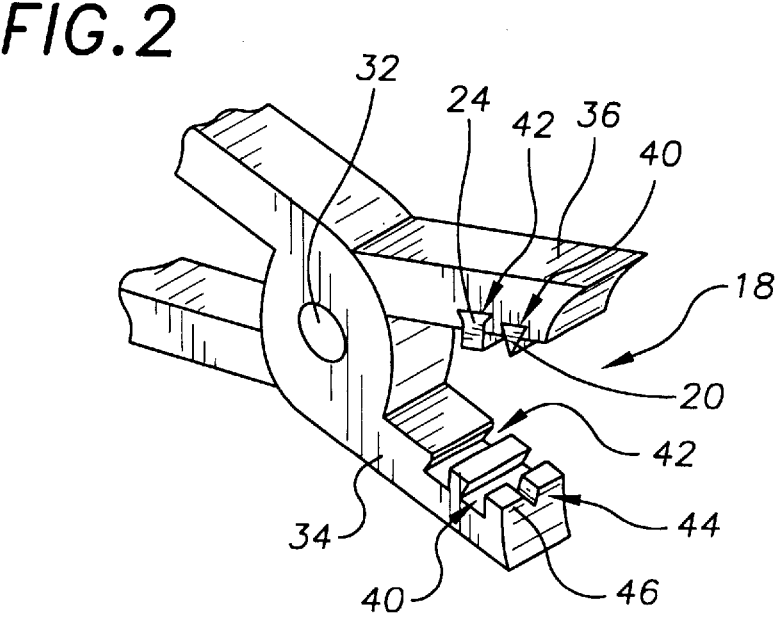
FIG. 2 is a detail perspective view of the jaw assembly of FIG. 1 showing the lower jaw portion, the upper jaw portion, the jaw pivot bar, the upper triangular shaped cutting blade installed in the upper blade retaining keyway channel of the upper jaw portion, the upper replaceable permanent magnet installed within the upper magnet retaining keyway channel of the upper jaw portion, the lower blade retaining keyway channel of the lower jaw portion, the lower magnet retaining keyway channel of the lower jaw portion, and the V-shaped hook alignment slot formed into the front edge of the lower jaw portion.

With reference to FIG. 2, jaw assembly 18 includes a lower jaw portion 34, an upper jaw portion 36, brass jaw pivot bar 32, upper triangular shaped cutting blade 20, upper replaceable permanent magnet 24, lower triangular shaped cutting blade 22 (Shown in FIG. 1), and lower replaceable permanent magnet 26 (shown in FIG. 1). Lower jaw portion 34 and upper jaw portion 36 each include a blade retaining keyway channel, generally designated 40; and a magnet retaining keyway channel, generally designated 42. Lower jaw portion 34 has a V-shaped hook alignment slot 44 formed into a front edge 46 thereof. Blade retaining keyway channels 40 are located on lower and upper jaw portions 34,36 in a manner such that a cutting edge 48 (FIG. 4) of identical upper and lower triangular shaped cutting blades 20,22 (FIG. 4) meet when lower and upper jaw portions 34,36 are pivoted together.

Figure 3:
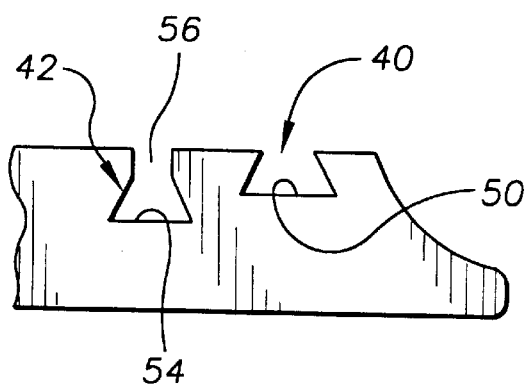
FIG. 3 is a side plan view of the lower jaw portion showing the cross-sectional shape of the lower blade retaining keyway channel and the lower magnet retaining keyway channel.

With reference to FIG. 3, blade retaining keyway channels 40 are identically sized and shaped. Each blade retaining keyway channel 40 has a portion 50 thereof having partial triangular cross sectional shape that is sized to receive and hold, respectively, a blade base portion 52 (FIG. 4) of upper and lower replaceable cutting blades 20,22. Magnet retaining keyway channels 42 are also identically sized and shaped. Each magnet retaining keyway channel 42 has a triangular cross sectional shaped portion 54 and a rectangular cross section shaped portion 56.

Figure 4:
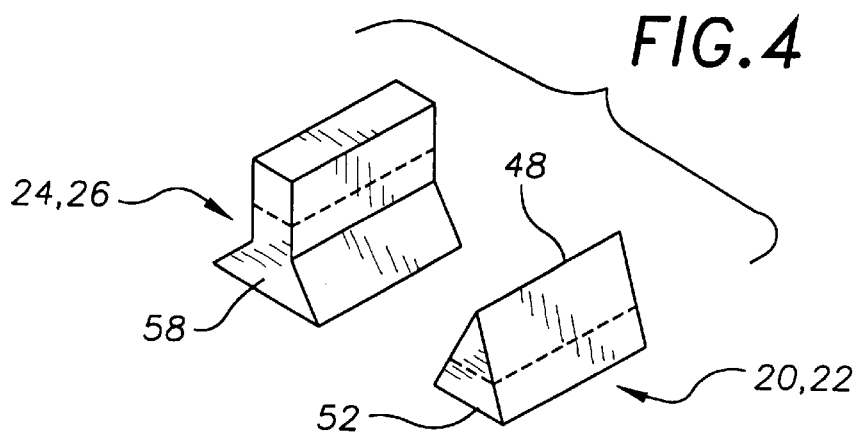
FIG. 4 is a perspective view of one of the identical replaceable triangular shaped cutting blades and one of the identical replaceable permanent magnets with the triangular shaped base portion.

Referring to FIG. 4, each upper and lower replaceable permanent magnet 24,26 includes a magnetic base portion 58 that is shaped and sized to correspond with the shape and size of each magnet retaining keyway channel 42. In this embodiment, each upper and lower replaceable permanent magnet 24,26, is a molded rubberized permanent magnet.

Figure 5:
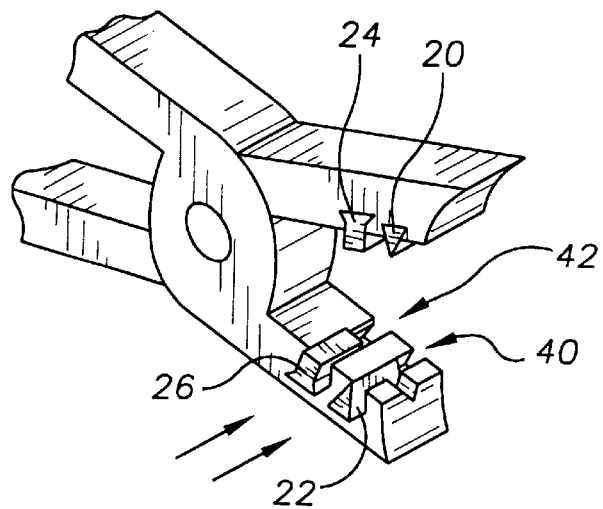
FIG. 5 is a detail perspective view showing one of the replaceable triangular shaped cutting blades partially inserted into the lower blade retaining keyway channel and one of the replaceable permanent magnets with the triangular shaped base portion partially inserted into the lower magnet retaining keyway channel.

With reference to FIG. 5, upper and lower replaceable cutting blades 20,22; and upper and lower replaceable permanent magnets 24,26 are installed by sliding each into its respective keyway channel 40,42.

With general reference to FIGS. 1–5, fish hook barb removing tool 10 is used by placing the barb of a fish hook onto lower replaceable permanent magnet 26 with a portion of the hook shank positioned within V-shaped hook alignment slot 44 and a second portion positioned onto edge 48 of lower triangular shaped cutting blade 22. Handle assembly 14 is then squeezed, causing jaw assembly 18 to close and upper and lower triangular shaped cutting blades 20,22 to cut the hook shank disconnecting the barb from the fish hook. Upper and lower replaceable permanent magnets 24,26 attract and hold the cut off fish hook barb and prevent it from being ingested by the fish.

It can be seen from the preceding description that a fish hook barb removing tool has been provided that includes a mechanism for trapping the cut off barb tip and preventing the cut off barb tip from being ingested by a fish; that includes a magnetic retaining mechanism for magnetically attracting and holding the cut off barb tip; that includes a magnetic retaining mechanism that includes replaceable permanent magnets for attracting and holding the cut off barb from a fish hook; that includes a magnetic retaining mechanism that includes a molded, rubberized permanent magnet; and that includes a clipping mechanism having a handle assembly, a return spring assembly, a jaw assembly, upper and lower replaceable triangular cross-section shaped cutting blades, and upper and lower replaceable permanent magnets each having a magnet base with a partial triangular shaped cross-section; the jaw assembly including an upper jaw portion and a lower jaw portion, the upper jaw portion having an upper blade retaining keyway channel and an upper magnet retaining keyway channel formed therein, the lower jaw portion having a lower blade retaining keyway channel, a lower magnet retaining keyway channel, and a hook alignment slot formed therein, the upper blade retaining keyway channel and the lower blade retaining keyway channel each having a portion thereof having partial triangular cross sectional shape that is sized to receive and hold, respectively, a blade base portion of the upper and lower replaceable cutting blades, the upper magnet retaining keyway channel and the lower magnet retaining keyway channel each having a partial triangular cross sectional shape and are each sized to receive and hold, respectively, the magnet base of one of the upper and lower replaceable permanent magnets.

It is noted that the embodiment of the fish hook barb removing tool described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fish hook barb removing tool comprising:

a clipping mechanism having a handle assembly including two opposed handle ends, a return spring assembly, a jaw assembly including a lower jaw portion and an upper jaw portion, upper and lower replaceable triangular cross-section shaped cutting blades, and a mechanism for trapping a cut off barb tip of a fish hook;

said handle assembly and jaw assembly being constructed from two clipper members that are pivotally connected in a clipper configuration to form said two opposed handle ends, said lower jaw portion and said upper jaw portion;

said return spring assembly being positioned between and biasing said two handle ends apart;

said upper replaceable triangular shaped cutting blade being carried on said upper jaw portion;

said lower replaceable triangular shaped cutting blade being carried on said lower jaw portion;

said mechanism for trapping a cut off barb tip of a fish hook being carried on said jaw assembly.

2. The fish hook barb removing tool of claim 1, wherein: said mechanism for trapping a cut off barb tip of a fish hook includes a magnetic retaining mechanism for magnetically attracting and holding said cut off barb tip.

3. The fish hook barb removing tool of claim 2, wherein:

said magnetic retaining mechanism includes replaceable permanent magnets for attracting and holding said cut off barb tip.

4. The fish hook barb removing tool of claim 3 wherein:

said replaceable permanent magnets are molded, rubberized permanent magnets.

5. The fish hook barb removing tool of claim 1 wherein:

said mechanism for trapping a cut off barb tip of a fish hook includes upper and lower replaceable permanent magnets each having a magnet base with a partial triangular shaped cross-section; and said jaw assembly includes an upper jaw portion and a lower jaw portion, said upper jaw portion having an upper blade retaining keyway channel and an upper magnet retaining keyway channel formed therein, said lower jaw portion having a lower blade retaining keyway channel, a lower magnet retaining keyway channel, and a hook alignment slot formed therein, said upper blade retaining keyway channel and said lower blade retaining keyway channel each having a portion thereof having partial triangular cross sectional shape that is sized to receive and hold, respectively, a blade base portion of said upper and lower replaceable cutting blades, said upper magnet retaining keyway channel and said lower magnet retaining keyway channel each having a partial triangular cross sectional shape and are each sized to receive and hold, respectively, said magnet base of one of said upper and lower replaceable permanent magnets.

6. The fish hook barb removing tool of claim 5 wherein:

said replaceable permanent magnets are molded, rubberized permanent magnets.

\* \* \* \* \*